Sept. 20, 1971        H. GUJER        3,605,607

BAND FILTER PRESS

Filed May 14, 1970        2 Sheets-Sheet 1

INVENTOR.
HANS GUJER
BY *Steven H. Kleeman*
ATTORNEY

United States Patent Office 3,605,607
Patented Sept. 20, 1971

3,605,607
BAND FILTER PRESS
Hans Gujer, Glattalstrasse 149,
Rumlang, Zurich, Switzerland
Filed May 14, 1970, Ser. No. 37,162
Claims priority, application Switzerland, May 14, 1969,
7,382/69
Int. Cl. B30b 9/24, 5/04
U.S. Cl. 100—118                17 Claims

ABSTRACT OF THE DISCLOSURE

A band filter press of the type incorporating two revolving press bands, wherein at least one such press band is constructed as a filter press band. These press bands being arranged in such a manner that they form therebetween a filter press compartment which narrows or tapers in the feed direction of the press product undergoing treatment, this filter press compartment being laterally sealed by suitable sealing devices. Furthermore, the press bands are supported in a direction towards one another by suitable resilient or spring elements. According to important aspects of the invention, at least one of the press bands bears upon a support at least at the portion of the press region or zone which merges with the press-out gap located at the lower extremity of said filter press compartment. This support is subdivided into sections supported by the resilient elements and movable towards one another at least transverse to the feed direction of the aforesaid one press band, and wherein the resilient elements of each support section collectively are subjected to a pre-bias, the magnitude of which is always smaller than the forces exerted upon each support section by the press product during maximum permissible operating pressure.

BACKGROUND OF THE INVENTION

The present invention relates to a new and improved band filter press of the type incorporating two revolving press bands, wherein at least one of which is constructed as a filter press band, such bands defining intermediate thereof a filter press compartment or cavity which tapers or narrows in the feed direction, the cavity being laterally sealed by suitable sealing elements, and further, wherein the press bands are supported against one another through the agency of suitable resilient elements.

Band filter presses of the aforementioned general type are already known to the art in a number of different constructions. Yet, they have not proven themselves to be completely satisfactory in operation since their practical construction is associated with a series of problems which up to now have not been resolved. One such problem resides in the fact that the forces occurring at the band filter presses could not previously be brought under control through the use of existing technological and economically feasible expedients.

When squeezing or pressing out press products in band filter presses, especially tower presses, the press product initially is subjected, as a general rule, to its hydrostatic pressure. Consequently, the fluid flows through the filter press bands. In so doing, a greater and greater amount of solid constituents deposit at the filter press bands. As soon as the solid coating contacts the filter press bands and the solids can no longer laterally escape, then, there begins the actual pressing or squeezing operation. Whereas previously the pressure increase in the filter press climbs linearly in accordance with the increasing hydrostatic pressure, the pressure in the press zone begins to increase very markedly and increases towards infinity.

Furthermore, local irregular deposition of solids at the filter press bands produce uncontrolled pressure peaks in the band filter presses. The start and degree of the pressure increase in the press zone as well as the occurrence of pressure peaks considerably changes from one type of press product to another type. Additionally, the forces which prevail still are dependent upon certain equipment parameters, such as velocity of the band, filter efficiency, and so forth. Up to now, the existing technology in this particular art was not capable of dealing with these uncontrolled forces in the known band filter presses.

Hence, for example, there is known to the art a band filter press of the previously mentioned type wherein two support frames arranged in the machine housing serve to support the filter press bands. These filter press bands are situated upon a rigid support. At least one of these support frames is pivotably mounted at the infeed side of the band filter press. Both frames are coupled with one another through the agency of spring or resilient elements. These spring elements render it possible to absorb the press pressure in its entirety, yet local pressure peaks acting upon the rigid frames practically do not have any effect upon the spring elements, rather act completely upon the support, oftentimes leading to a disturbance or destruction of the equipment. If this defect is to be eliminated, then it is necessary to either construct over-dimensioned band presses or to maintain at a low value their operating pressure.

SUMMARY OF THE INVENTION

Therefore, a real need exists in the art to provide a band filter press which effectively overcomes the aforementioned drawbacks of the heretofore known prior art constructions. Hence, a primary objective of the present invention is to devise a new and improved band filter press which does just that.

Another, more specific object of the present invention relates to an improved band filter press which eliminates the aforementioned drawbacks of the prior art constructions, and more specifically, relates to an improved band filter press which is designed and constructed such that it operates faultlessly even at as high an operating pressure as feasible and which can be fabricated economically.

Now, in order to implement these and still further objects of the invention, which will become more readily apparent as the description proceeds, the inventive band filter press is manifested by the features that at least one press band bears upon a support at least at the portion of the press region or zone which merges with the squeeze-out or press-out gap. This support is subdivided at least transverse to the feed direction of the press band into sections, supported by the resilient or spring elements, and movable towards one another. The spring elements of each support section collectively are subjected to a pre-tension or pre-bias, the magnitude of which, in each instance, is smaller than the force exerted by the press product upon each support section during maximum permissible operating pressure.

By virtue of the design of the inventive band filter press there are provided an entire series of quite decisive advantages. Since at least the portion of the press zone or region merging with the press-out gap, and where the highest press pressures occur, is equipped with support sections which are movable relative to one another, irregular accumulations of solids at the filter press bands, no longer act upon the entire support construction of the band filter press, rather only exert a pressure upon the relevant support section. This support section can thus give since, on the one hand, it is movable towards the neighboring support section and, on the other hand, is supported upon spring elements. Consequently, such material accumulations no longer result in pressure breaks or at most result in diminished pressure increases. Hence, the actual support construction is no longer subjected to uncontrolled forces.

Furthermore, with the inventive band filter press it is possible to always operate such at the limit of the maximum permissible operating pressure. Since the spring elements associated with each support section have a pre-bias, the magnitude of which is smaller than the force exerted by the press product upon each support section during maximum permissible operating pressure, the band filter press can be operated in such a way that the spring elements just begin to compress. Hence, by virtue of such one can ascertain that the band filter press is operating at the optimum range where the press product is subjected to a pressure which is near the maximum permissible operating pressure, and that there is no danger of damage to the band filter press.

The pre-biasing of the spring elements results in still further decisive advantages. It is thus possible to design the equipment such that the maximum pressure determining the manufacturing costs of the band filter press and the operating pressure determining the usefulness of the band filter press are very close together, thereby providing a large safety boundary value. The pre-biasing renders possible the use of very soft springs which can there be pre-stressed to such an extent that their pre-stress or pre-biasing is close to the value of the forces occurring during maximum operating pressure. When using soft spring elements there still remains a sufficient spring path during small force differences in order to compensate for any possibly occurring irregularities of the press product which otherwise could result in the presence of uncontrolled forces.

Moreover, the pre-biasing of the spring elements enables limiting the movable support sections to that portion of the band filter pressure which actually is subjected to the highest loads. This is that portion of the press zone or region which is located directly in front of the press-out gap. Consequently, it is possible to avoid changes in shape of the press band during transition from the rigid support of the press band to the support via the spring mounted support sections. There is thus ensured for a practically smooth transition from one zone or region into the other.

As a general rule, it is sufficient if only one press band is equipped with the support sections braced or supported by the spring or resilient elements. This is especially then the case if press products are to be processed which are uniform both with respect to their composition as well as their consistency. On the other hand, if the composition and the consistency of the press products fluctuatas very markedly, then it is advantageous to also place the second press band upon a support at least at the portion of the press region merging with the press-out gap. This support is advantageously subdivided into sections supported via the spring elements and which are at least movable towards one another transverse to the feed direction of the press band. Furthermore, the spring elements of each support section are collectively subjected to a pre-bias, the magnitude of which in each instance is smaller than the forces exerted by the press product or material upon each support section during maximum permissible operating pressure. Consequently, there can be increased the insensitivity of the equipment against different press products and therefore against changing pressure peaks.

The further possibility of constructing such a band filter press to be more versatile or variable resides in constructing the mutual spacing of the press bands to be changeable. Consequently, this spacing, especially at the region of the press-out gap, can be changed if it is found that the spring elements are compressed too strongly by the press product, that is to say, the operating pressure of the band filter press approaches the maximum operating pressure. Such an accommodation of the mutual spacing of the press bands can be carried out with a manually actuated mechanism. It is particularly advantageous if, on the other hand, there is provided for this purpose a control mechanism which performs a control of the mutual spacing of the press bands as a function of the compression of the spring elements. Such a control mechanism can be equipped with switch means responsive to a minimum and a maximum compression of the spring elements, which are operatively coupled with the control mechanism in such a fashion that during minimum compression of the spring elements there occurs a reduction of the mutual spacing of the press bands and during maximum compression an increase of such mutual spacing of the press bands, preferably in a central position of the compression situated between both extreme positions.

The spring elements can be pre-biased in very different ways and manner. It is particularly advantageous if the spring elements themselves are pre-biased so that the press bands when the system is not in operation are not pressed against one another under the influence of the pre-biasing of the spring elements. As a result, there can be, for instance, optionally varied the mutual spacing of the press bands independent of the spring pre-biasing force when the equipment is not in operation. On the other hand, it is also equally possible to pre-bias the spring elements by pressing together the press bands.

Furthermore, it should be understood that the band filter press of the invention can be constructed so that it operates both as a horizontal filter press as well as a standing filter press. The advantages obtained by virtue of the inventive concepts can be realized in both types of equipment. In particular, when the equipment is designed as a horizontal filter press, then it can be completely sufficient if only one of the press bands, and specifically the lower press band is constructed as a filter press band, through which the filtrate escapes during the pressing operation, whereas the upper press band is impervious. On the other hand, with tower or vertical presses both press bands are advantageously constructed as filter press bands.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
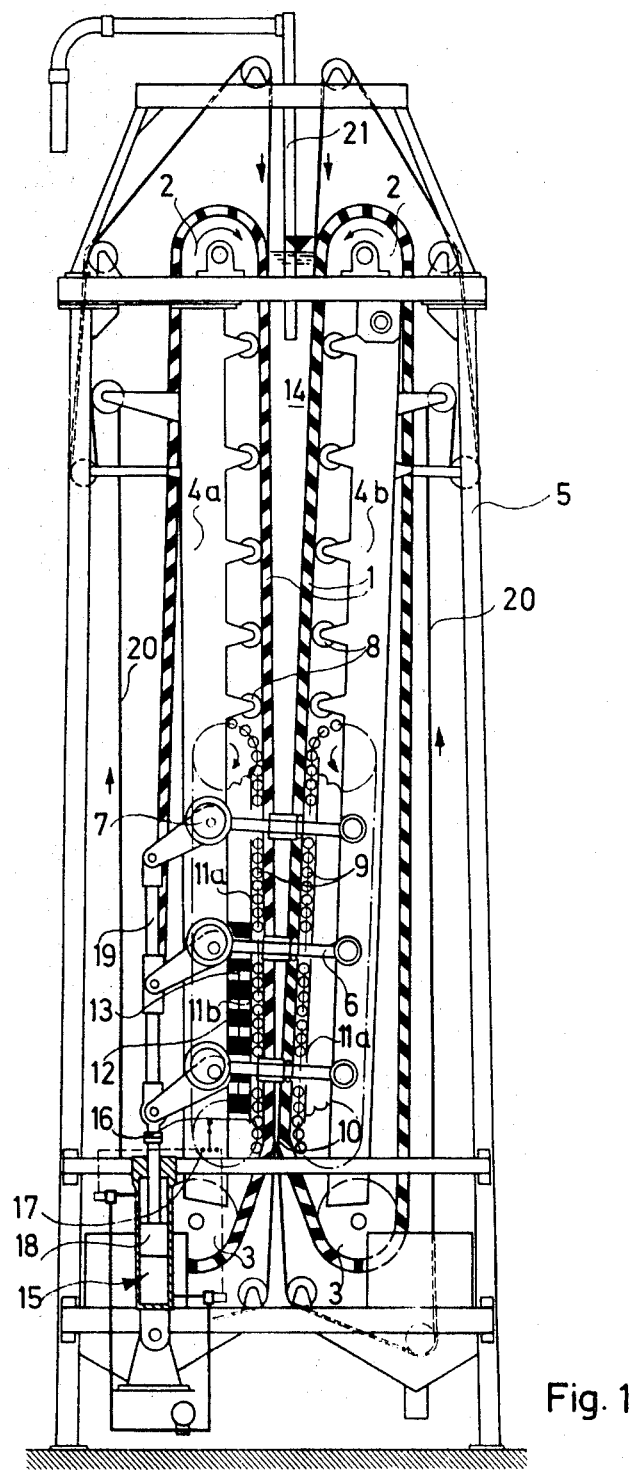
FIG. 1 is a schematic representation, partially in sectional view, of a first preferred embodiment of inventive tower or vertical press, showing in side view the filter press bands.

Describing now the drawings, the exemplary embodiment of tower or vertical filter press illustrated by way of example in FIG. 1 will be seen to comprise two vertically arranged endless filter press bands 1 which are trained about upper sprocket wheels 2 and lower sprocket wheels 3. The lower sprocket wheels 3 are suitably driven by any appropriate drive mechanism. These filter press bands can be of known construction, or specifically, may for instance be designed in accordance with the teachings of Swiss Pat. 476,508. In such case, they would be formed of plastic elements which are assembled together in chain-link fashion. The sprocket wheels 2, 3 of each filter press band 1 are rotatably mounted at a respective carrier or support frame 4a and 4b. The one support frame 4a is rigidly arranged at the machine housing 5, whereas the other support frame 4b is pivotably mounted at its upper end at the machine housing or frame 5 for movement towards the other support frame 4a. Due to the pivotable arrangement of the one support frame 4b it is possible to regulate the mutual spacing of the filter press bands 1 from one another.

Continuing, it will be observed that both support frames 4a and 4b are operatively coupled with one another through the agency of suitable tie or connecting rods 6 which are pivotably secured to each support frame 4a, 4b. Furthermore, at one end of the tie or connecting rods 6 the pivotable connection to the support frame 4a is undertaken through the agency of a suitable eccentric mechanism 7. This eccentric mechanism 7 enables adjustment of the effective length of the tie or connecting rod 6, and therefore, permits variation of the mutual spacing of the filter press bands 1. In the exemplary embodiment shown herein, three such tie rods 6 have been conveniently provided, and wherein the eccentricity of the eccentric mechanism 7 of the tie rods becomes greater with increasing spacing from the upper sprocket wheels 2. During coupled actuation of the eccentric mechanism 7 it is therefore possible to attain a uniform adjustment of the mutual spacing of the filter press bands 1.

Figure 2:
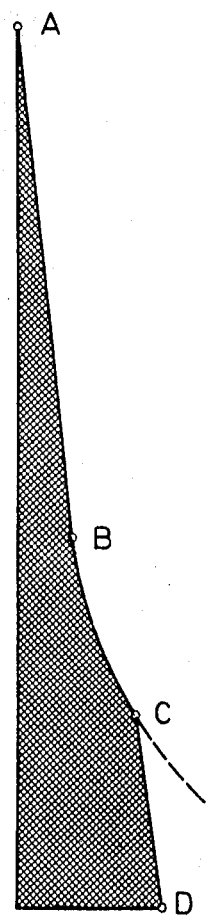
FIG. 2 is a graph showing the pressure curve depicting the pressure conditions prevailing along the tower or vertical press of the invention depicted in FIG. 1.

Now, in order to support the filter press bands 1 at the carrier or support frames 4a and 4b there are advantageously provided at the upper region of the tower filter press suitable support rollers 8. These support rollers 8 are located at the region of the filter press where only the inherent hydrostatic pressure of the press product acts upon the latter. Merging with this region, and indicated by location B (FIG. 2) is the actual press zone where the press product is subjected to an increased pressure. In the press zone, which extends up to the press-out of squeeze-out gap 10 and is depicted in the graph of FIG. 2 by the curve portion BCD, the filter press bands 1 are supported via roller conveyors upon the support arrangement of the invention which will be now considered in detail. The support 11a of a filter press band 1 which is still rigid at the start of the pressure zone B is relieved, in a direction towards the press-out gap 10, by support sections 11b which are movable towards one another and extend transverse to the conveying or feed direction. These support sections 11b are supported through the agency of suitable resilient or spring elements 12 at the support frame 4a. The movable support sections 11b do not extend over the entire region of the pressure zone of the tower press, rather only over a portion thereof, corresponding to the pressure curve portion CD of FIG. 2. On the other hand, the other filter press band 1, in this case that associated with the pivotable support frame 4b, is disposed over the entire length of the pressure region or zone BCD upon a rigid support 11a.

In the exemplary embodiment under consideration, there are provided for the resilient or spring elements 12 rubber buffers which extend practically over the entire width of the filter press band 1 and are uniformly distributed over the length CD of the press region up to the press-out gap 10. Connection elements 13 arranged between the rubber buffers interconnect the individual rubber buffers into a resilient package which is exchangeably arranged at the tower filter press. The individual resilient or spring elements 12 of the resilient package are pre-biased. This resilient package can be constructed as a pre-fabricated already pre-biased component. This renders possible not only a rapid exchange of any resilient elements which have become damaged in the tower press, but further also enables equipping the press zone with more or less resiliently supported support sections which are movable towards one another. In such case, naturally the rigid support 11a is to be removed. Consequently, it is possible to accommodate the tower press in a very simple manner to the individual operating conditions or the characteristics of the press products. In contrast to the illustrated embodiment, it is also possible to employ as the resilient elements helical springs, as such will be more fully explained in conjunction with the embodiments of band filter presses depicted in FIGS. 3–6 inclusive.

The resilient package serves as the support, whereby the resilient elements situated in a row and for instance covered by a common covering, form a support section which is movable relative to the support section of the neighboring row of resilient or spring elements. However, it is also possible to design the system such that each resilient or spring element itself directly serves as a support section. In this instance, then, the subdivision of the support is made finer, that is to say, it is not only subdivided into sections extending transverse to the feed or conveying direction, rather also into sections extending along the feed or conveying direction. This affords optimum accommodation of the support to the momentarily encountered operating conditions in the press compartment or cavity between the filter press bands 1. However, such an extensive accommodation of the equipment to the operation conditions, at most, only is necessary in the most rare situations.

The filter press bands 1 define therebetween a press compartment or cavity 14 which tapers or narrows in the feed direction, and which at its lower end is closed by the press-out gap 10. In order to laterally delimit the press compartment 14 there are advantageously provided any suitable sealing devices known to the art. One particularly suitable form of lateral sealing devices have been shown and described in the copending application of Hans Gujer, the inventor of this development, and Karl Koller, filed July 1, 1969, Ser. No. 838,293, entitled "Device for Sealing Off the filter Press Cavity Between Two Filter Press Elements, Preferably Two Revolving Filter Press Bands or Belts of a Filter Press," and to which reference may be readily had. In order to preserve clarity in illustration, and since the actual construction of the lateral sealing devices does not form part of the instant invention, such have been conveniently omitted from the drawings.

The tower or vertical press under consideration furthermore is advantageously equipped with a suitable control mechanism 15 by means of which it is possible to regulate the mutual spacing of the filter press bands 1. To this end, it will be seen that there is provided a feeler member 16 coupled with the side of the resilient package confronting the associated filter press band 1 and which cooperates with two terminal switches 17. Switches 17 control a suitable hydraulic cylinder-piston arrangement 18 which is coupled via the piston rod 19 with the eccentric mechanisms 7.

Furthermore, the filter press bands 1 are additionally covered with endless filter cloths 20 which are guided in separate paths externally of the filter press compartment 14, as shown.

Now the mode of operation of the tower press heretofore described is as follows: At the beginning of the filter press operation the movable support frame 4b is adjusted in such a fashion that the press-out gap 10 is closed. Thereafter, a sufficient quantity of press product or material is introduced via the conduit 21 into the tower press until the level A has been reached. This product level A is maintained during operation of the tower press. The filter press operation itself now proceeds in three phases, the liquid phase, the mechanical press phase and the afterpress phase. Both of the last mentioned phases are determined by the actual pressure zone BCD.

During the liquid or fluid phase the thickening of the press product only occurs through the inherent hydrostatic pressure. The first contact of the press product with the filter cloths 20 occurs during the smallest pressure and the filter cloths 20 permit the liquid to of course flow therethrough. Consequently, an initially loose or fluffy, yet continuously solidifying solid layer forms at the filter cloths 20, which from the beginning acts as a filter auxiliary layer. It is for this reason that it is also possible to use coarse mesh, porous filter cloths or even nets.

The two solid layers begin to build up more and more upon the vertically travelling filter cloths 20 in a direction towards the lower end of the equipment, so that finally they contact one another at the downwardly tapering or narrowing press compartment 14. At this location, which has been designated by position B of the pressure diagram of FIG. 2, there occurs the mechanical press phase, corresponding to the pressure curve portion BC of the pressure curve of FIG. 2. Depending upon the characteristics of the press material, the beginning of the mechanical phase can vary. The start of the mechanical phase can be regulated by adjusting the velocity or speed of the filter press bands 1 to the beginning of the massive constructed press path. With higher press band velocities the point B of the beginning or start of the mechanical press phase is situated lower and with lower velocities it is situated higher. The mechanical pressing or compression, after contact of both solid layers with one another, increases continuously because the individual solid particles tend to be less able to deviate from one another and the solid layers are positively drawn into the narrowing gap of the filter press compartment 14 by the continuously downwardly travelling filter press bands 1. At the termination of the mechanical press phase, which occurs at location C of the pressure curve of FIG. 2, there begins the after press phase which takes place up to position D of such curve, in other words up to the region of the press-out gap 10. The transition between the mechanical press phase and the after press phase is determined by the pre-biasing of the resilient or spring elements of the subdivided section of the support arrangement. At this point the pressure increase in the press compartment can no longer optionally continue, rather the resilient elements gradually begin to compress so that a considerable further pressure increase is eliminated. In the afterpress phase the press material is subjected for a longer period of time to a predetermined pressure corresponding to the pre-biasing. The throughpassing press material opens the press-out gap 10 to such an extent that it can escape. According to one practical embodiment of inventive band filter press, the pre-biasing of the resilient elements was selected such that it corresponded to an operating pressure of 2 atmospheres absolute pressure. Only upon reaching an operating pressure of 2 atmospheres absolute pressure did the support sections begin to move and the resilient elements compress together. The press product cakes or briquettes departing from the squeeze-out or press-out gap 10 must be, therefore, subjected in each case to a press pressure above 2 atmospheres absolute pressure. With increasing press cake thickness the press pressure increaed to a maximum 2.5 atmospheres absolute pressure with 4 mm. cake thickness. There is no danger in damaging the tower press provided that therefore the thickness of the press cakes is in a range within 4 mm.

In the case of press products which possess an exact composition, uniform consistency and can be treated during continuous operation, it is possible to leave the once selected setting of the mutual arrangement of the filter press bands 1. However, when dealing with markedly changing press products it is especially advantageous to make use of the aforementioned control mechanism. The movable support frame can then always be adjusted by means of the control mechanism to the maximum penetration depth, for instance 4 mm., of the pre-biased resilient or spring elements, even if the press product cakes or briquettes themselves have a greater thickness, for instance 6 mm.

Having now had the benefit of the foregoing description of the preferred embodiment of tower filter press depicted in FIGS. 1 and 2, and having now described the operation of such press as well as its physical construction, attention is now directed to FIGS. 3–6 wherein there are disclosed further exemplary embodiments of the structure of the press zone, in other words the region of the filter press where there is carried out the mechanical press phase and the after press phase. To simplify the discussion of these embodiments and to preserve clarity in illustration of the drawings, only enough of the structure of the filter press has been depicted therein to enable one to fully understand the inventive concepts involved with these embodiments.

Figure 3:
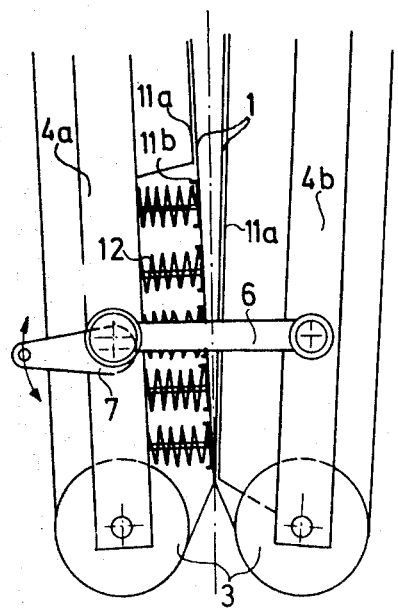
FIGS. 3-6 inclusive schematically depict further respective embodiments of the press zone or region of a tower or vertical press, showing in side view details of the filter press bands.
Figure 4:
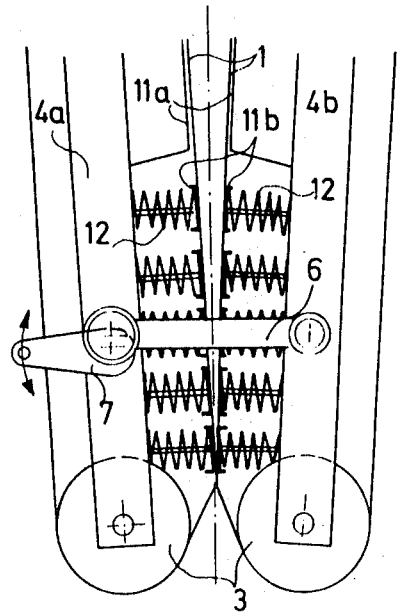

Turning now to the embodiment of FIG. 3, it will be recognized that such essentially corresponds to the filter press structure of the arrangement of FIG. 1, yet here the three tie or connecting bolts are replaced by a single tie or connecting bolt 6. Likewise, FIG. 4 illustrates a similar embodiment in which at the press zone in front of the press-out gap 10 not only one filter press band 1 is supported upon movable support sections 11b, rather also the other filter press band 1 of the second support frame 4b.

Figure 5:
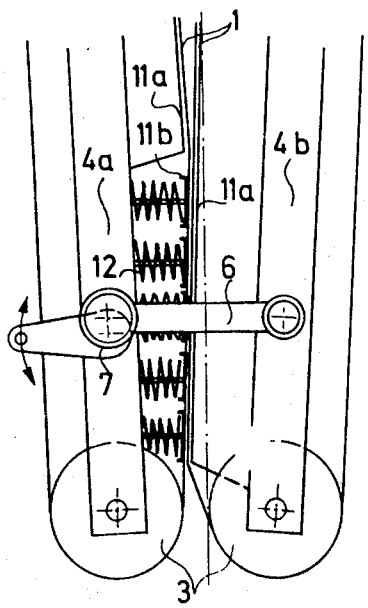

The embodiment of filter press depicted in FIG. 5 is constructed similar to the embodiment of filter press of FIG. 3, yet in this instance there are not employed previously pre-biased resilient or spring elements 12. The pre-biasing or pre-stressing of these resilient elements, in this embodiment, is undertaken in that both support frames 4a and 4b are biased towards one another so that the filter press bands 1 are pressed against one another. In so doing, the resilient or spring elements 12 are compressed and subjected to a pre-biasing. One drawback with this arrangement, however, is that the filter press bands 1 bear against one another over a wide region and the pre-biasing does not occur uniformly over the entire press zone. Additionally, the monitoring or supervision of this tower press and, in particular, any possible control thereof is complicated since the conditions cannot be supervised so simply.

Figure 6:
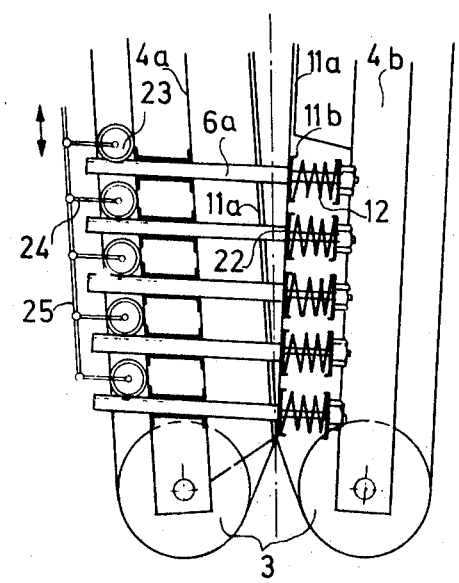

FIG. 6 depicts a further embodiment of inventive press in which one filter press band 1 is secured to a support or carrier frame 4a, at which to both sides of the filter press band there are provided connecting or tie rods 6a adjustable with regard to their respective lengths. These tie rods 6a, in each case, are provided at the side facing the other filter press band 1 with a respective resilient or spring element 12 which is pre-biased against a stop 22 of the associated tie rod 6a. This stop 22 bears against the side of the resilient element confronting the first filter press band 1. Now, in each instance, between the resilient element 12 and the stop 22 there is clamped a movable support section which with increasing pressure in the press compartment 14 exerts a force upon the associated spring or resilient element 12 so that such can deviate against the spring force. In order to adjust the tie rods 6a they are arranged to be displaceable in their axial direction at the support or carrier frame 4a. In this instance, there can be used as the adjusting mechanism gears 23 which mesh with the connecting or tie rods 6a and which, in turn, in each instance, support arms 24 coupled with an actuation rod 25.

In this embodiment the support frame of the second filter press band does not contribute to the supporting of the movable support section since this is directly retained via the connecting rods of the support frame of the first filter press band. When the equipment is not in operation there is not provided a tensioning of the filter press bands. Additionally, the gap between the filter press bands can be adjusted at any time independent of the pre-biasing of the spring or resilient elements.

Finally, it is here mentioned that while the filter press of the invention has been conveniently shown and described with respect to a vertical or tower filter press, the inventive aspects and features as well as the advantages attained thereby are equally applicable and can be realized with a substantially horizontally arranged filter press.

While there is shown and described present preferred embodiments of the invention, it is to be distinctly under-

What is claimed is:

1. A band filter press for press products, comprising two revolving press bands, at least one of said press bands being constructed to define a filter press band, means for mounting said two press bands to form therebetween a filter press compartment which narrows in the feed direction of said press bands, said filter press compartment possessing a press-out gap at its lower region, resilient elements for supporting said press bands in a direction towards one another, support means against which bears at least one of said press bands at least at the portion of the press zone neighboring said press-out gap, said support means being subdivided into sections supported via said resilient elements and movable relative to one another in a direction at least substantially transverse to said feed direction of said press bands, said resilient elements of each support section collectively being subjected to a pre-biasing force, the magnitude of which is smaller than the force exerted by the press product upon each support section during maximum permissible operating pressure of the band filter press.

2. A band filter press as defined in claim 1, including additional support means against which bears the other of said press bands at least at the portion of the press zone neighboring said press-out gap, said additional support means being subdivided into sections supported via said resilient elements and movable relative to one another in a direction at least substantially transverse to the feed direction of said press bands, said resilient elements of each support section collectively being subjected to a pre-bias force, the magnitude of which is smaller than the force exerted by the press product upon each support section during maximum permissible operating pressure of the band filter press.

3. A band filter press as defined in claim 1, wherein said support sections additionally are subdivided into sections supported via said resilient elements and movable relative to one another in the feed direction of said press bands.

4. A band filter press as defined in claim 2, wherein said support sections are additionally subdivided into sections supported via said resilient elements and movable relative to one another in the feed direction of said press bands.

5. A band filter press as defined in claim 1, wherein said resilient elements themselves are pre-biased so that said press bands, when said band filter press is not in operation, are not pressed against one another under the influence of said pre-biasing of said resilient elements.

6. A band filter press as defined in claim 1, wherein said resilient elements are pre-biased by pressing said press bands into contact with one another.

7. A band filter press as defined in claim 1, wherein said resilient elements associated with a support section incorporate means for assembling together said resilient elements into a resilient package.

8. A band filter press as defined in claim 7, wherein said resilient package is constructed as a pre-fabricated component which can be exchangeably arranged at said band filter press.

9. A band filter press as defined in claim 7, wherein said resilient package is pre-biased.

10. A band filter press as defined in claim 1, wherein said resilient elements comprise rubber buffer means.

11. A band filter press as defined in claim 1, further including roller conveyor means for supporting said at least one press band which bears against said support means upon said support sections.

12. A band filter press as defined in claim 5, wherein said mounting means for said press bands comprises a support construction for at least said one press band bearing against said support means, tie rod means adjustable with respect to their effectve length arranged to both sides of said last-mentioned one press band at said support construction, each of said tie rod means being provided with a stop member, a respective pre-biased resilient element carried by each tie rod means at the side of the other press band and bearing against the associated stop member of such tie rod means, said stop member being situated at the side of said resilient element confronting the first-mentioned press band, and attachment means for said support section clamped between said resilient element and its associated stop member.

13. A band filter press as defined in claim 1, further including a machine frame unit, said mounting means for said press bands comprising respective support frames over which each associated press band is guided, means for pivotably mounting at least one of said support frames at an infeed side of said band filter press, and a plurality of tie rod means adjustable with respect to their effective length for operatively interconnecting said support frames with one another, said tie rod means being distributed at least over the length of said press zone of said band filter press.

14. A band filter press as defined in claim 13, further including means for pivotably mounting said tie rod means at said support frames, said pivotable mounting means comprising eccentric means which are collectively adjustable and wherein the eccentricity of said eccentric means increasingly becomes smaller at a smaller distance from said infeed side of the band filter press in such a manner that upon actuation of said eccentric means the change of the mutual spacing of said press bands is undertaken porportionally along said filter press compartment.

15. A band filter press as defined in claim 1, further including means for regulating the mutual spacing of said press bands from one another, control means cooperating with said regulating means, said control means containing switch means responsive to a minimum and a maximum compression of said resilient elements, said control means being operatively coupled with said regulating means for the mutual spacing of said press bands in such a manner that during minimum compression of said resilient elements there occurs a reduction of said mutual spacing of said press bands from one another and during maximum compression of said resilient elements an increase of said mutual spacing of said press bands from one another.

16. A band filter press as defined in claim 15, wherein said control means comprises an electrical-hydaulic construction incorporating a hydraulic cylinder-piston arrangement, tie rod means for operatively interconnecting said press bands, and an adjustment mechanism for said tie rod means, said cylinder-piston arrangement being operatively coupled with said adjustment mechanism.

17. A band filter press as defined in claim 1, wherein both of said press bands are constructed as filter press bands.

References Cited

UNITED STATES PATENTS

| | | | |
|---|---|---|---|
| 814,987 | 3/1906 | Richardson | 100—154 |
| 1,778,342 | 10/1930 | Thompson | 100—118XR |
| 2,382,453 | 8/1945 | Thompson | 100—118XR |
| 2,554,968 | 5/1951 | Thompson | 100—151XR |

PETER FELDMAN, Primary Examiner

U.S. Cl. X.R.

100—154